United States Patent
Böck et al.

[11] Patent Number: 6,021,938
[45] Date of Patent: Feb. 8, 2000

[54] PROCESS AND DEVICE FOR FRICTION WELDING OF WORKPIECES

[75] Inventors: Johann Böck, Kissing; Walter Gröger, Emersacker; Karel Mazac, Friedberg, all of Germany

[73] Assignee: Kuka Schweissanlagen GmbH, Germany

[21] Appl. No.: 08/981,276

[22] PCT Filed: Jun. 21, 1996

[86] PCT No.: PCT/EP96/02702

§ 371 Date: Apr. 24, 1998

§ 102(e) Date: Apr. 24, 1998

[87] PCT Pub. No.: WO97/01412

PCT Pub. Date: Jan. 16, 1997

[30] Foreign Application Priority Data

Jun. 27, 1995 [DE] Germany .......................... 195 23 240

[51] Int. Cl.$^7$ .............................. B23K 20/12; B23K 1/00; B23K 31/12

[52] U.S. Cl. ........................ 228/112.1; 228/2.1; 228/102; 228/103; 228/114.5

[58] Field of Search .................................. 228/7, 13, 2.1, 228/112.1, 114.5, 102, 114, 103

[56] References Cited

U.S. PATENT DOCUMENTS

| | | |
|---|---|---|
| 3,273,233 | 9/1966 | Oberle et al. . |
| 3,972,465 | 8/1976 | Takaoka et al. ......................... 228/112 |
| 3,973,715 | 8/1976 | Rust . |
| 4,741,788 | 5/1988 | Clark et al. ................................ 156/64 |
| 4,743,331 | 5/1988 | Nuttall et al. ............................ 156/358 |
| 5,647,950 | 7/1997 | Reed et al. .............................. 156/580 |

FOREIGN PATENT DOCUMENTS

| | | |
|---|---|---|
| 81 00 909 U | 12/1983 | Germany . |
| 32 26 362 C2 | 1/1984 | Germany . |
| 221 105 A1 | 4/1985 | Germany . |
| 63-194881 | 8/1988 | Japan . |
| 2 091 153 | 7/1982 | United Kingdom . |

OTHER PUBLICATIONS

Metals Handbook Ninth Edition, vol. 6 (pp. 719–728), 1983.

*Primary Examiner*—Patrick Ryan
*Assistant Examiner*—Kiley Stoner
*Attorney, Agent, or Firm*—McGlew and Tuttle, P.C.

[57] ABSTRACT

Process and device for the friction welding of workpieces that consist of different materials or possess different material properties, especially different hardnesses and/or melting points. The workpieces are rotated over a limited angle of rotation of less than 1,080°, preferably 290° to 430°, relative to one another during the friction process. The angle of rotation is controlled via the friction time and the switching off of the rotating drive. The more resistant workpiece is preferably rotated and is leveled off on its face before the friction welding.

24 Claims, 2 Drawing Sheets

PROCESS AND DEVICE FOR FRICTION WELDING OF WORKPIECES

This application claims priority under 35 USC §119(e)(1) of PCT international application number EP96/02702 filed Jun. 2, 1996.

FIELD OF THE INVENTION

The present invention pertains to a process and a device for the friction welding of workpieces that consist of different materials or possess different material properties, especially different hardnesses and/or melting points, where the workpieces are rotated in frictional contact in relation to one another, stopped and upset.

BACKGROUND OF THE INVENTION

Various designs of friction welding processes and friction welding devices have been known in practice. The two workpieces to be welded together are, e.g., rotated relative to one another in frictional contact, while they are heated and plasticized in the friction area. The rotary drive is stopped after an intended period of time, as a result of which the relative rotation slows down with braking and comes to a standstill. The two workpieces are upset and connected during the slowing down. The friction process takes several seconds in prior-art friction welding process, using speeds of 1,000 rpm and more. This prior-art process is practical for identical material, or materials possessing very similar properties and has proved successful. This friction welding process cannot be used satisfactorily for the friction welding of workpieces that consist of different materials, e.g., aluminum and steel, but possess different material properties, e.g., soft or hard light metal alloys. The friction weld joints do not have the desired strength, nor a sufficiently reproducible quality.

SUMMARY AND OBJECTS OF THE INVENTION

The primary object of the present invention is therefore to provide a friction welding process and a corresponding device, which lead to a good weld quality even in the case of workpieces that consist of different materials or possess different material properties.

This object is accomplished by the present invention rotating the workpieces relative to each other. At least one of the workpieces is then moved toward the other workpiece to bring the workpieces into frictional contact with each other. The moving is done at a speed and with a force to cause the two workpieces to be friction welded together in less than 3 complete relative revolutions. The actual speed and force can vary within certain ranges to form the friction weld in less than 3 revolutions and the range of the speed and force can vary depending on the materials being welded.

The device for performing this process includes a rotating means for rotating one of the workpieces with respect to another of the workpieces. A feeding means feeds the relative rotating workpieces into the frictional contact with each other at or under a feed pressure to cause the friction welding of the workpieces to each other. A control means detects a beginning of said frictional contact and sets a friction time of the workpieces being in the frictional contact. The control means also) controls the rotating means and the feeding means to limit the angle of rotation between the workpieces to less than 1,080 degrees during the frictional contact.

It is very important in the present invention that the entire angle of rotation is limited to a low value during the friction process. The practical experience gained with the present invention shows that the angle of rotation should not be greater than 1,080° or three complete revolutions. The angle of rotation should be between 180° and 720° for the frequently used material pairs consisting of steel and aluminum or soft and hard light metal alloys, and optimal results are obtained in an angle of rotation range of 290° to 430°. The angle of rotation ranges may vary for other material pairs. At any rate, they are substantially smaller than in the case of prior-art processes.

The process according to the present invention and the corresponding device are suitable for all applications in which the workpieces consist of materials with differences in the material properties, especially the hardness and/or the melting point. Such pairs are obtained, on the one band, from completely different materials, such as steel and light metal alloys, e.g., aluminum, magnesium/aluminum, etc. The fields of application also cover light metal alloys or nonferrous metals with one another, if the materials of the pair differ in terms of hardness, strength, melting point, etc., due to different beat treatment, alloy formation, etc. The melting properties may differ greatly for other reasons as well.

The preferred field of use is tubular, especially cylindrically tubular workpieces. However, massive/tubular pairs are also possible. Good results were obtained in experiments for tubes with external diameter/wall thickness dimension ratios of 10:1 or greater, preferably 20:1 or greater.

The various features of novelty which characterize the invention are pointed out with particularity in the claims annexed to and forming a part of this disclosure. For a better understanding of the invention, its operating advantages and specific objects attained by its uses, reference is made to the accompanying drawings arid descriptive matter in which preferred embodiments of the invention are illustrated.

DESCRIPTION OF THE PREFERRED EMBODIMENT

Figure 1:
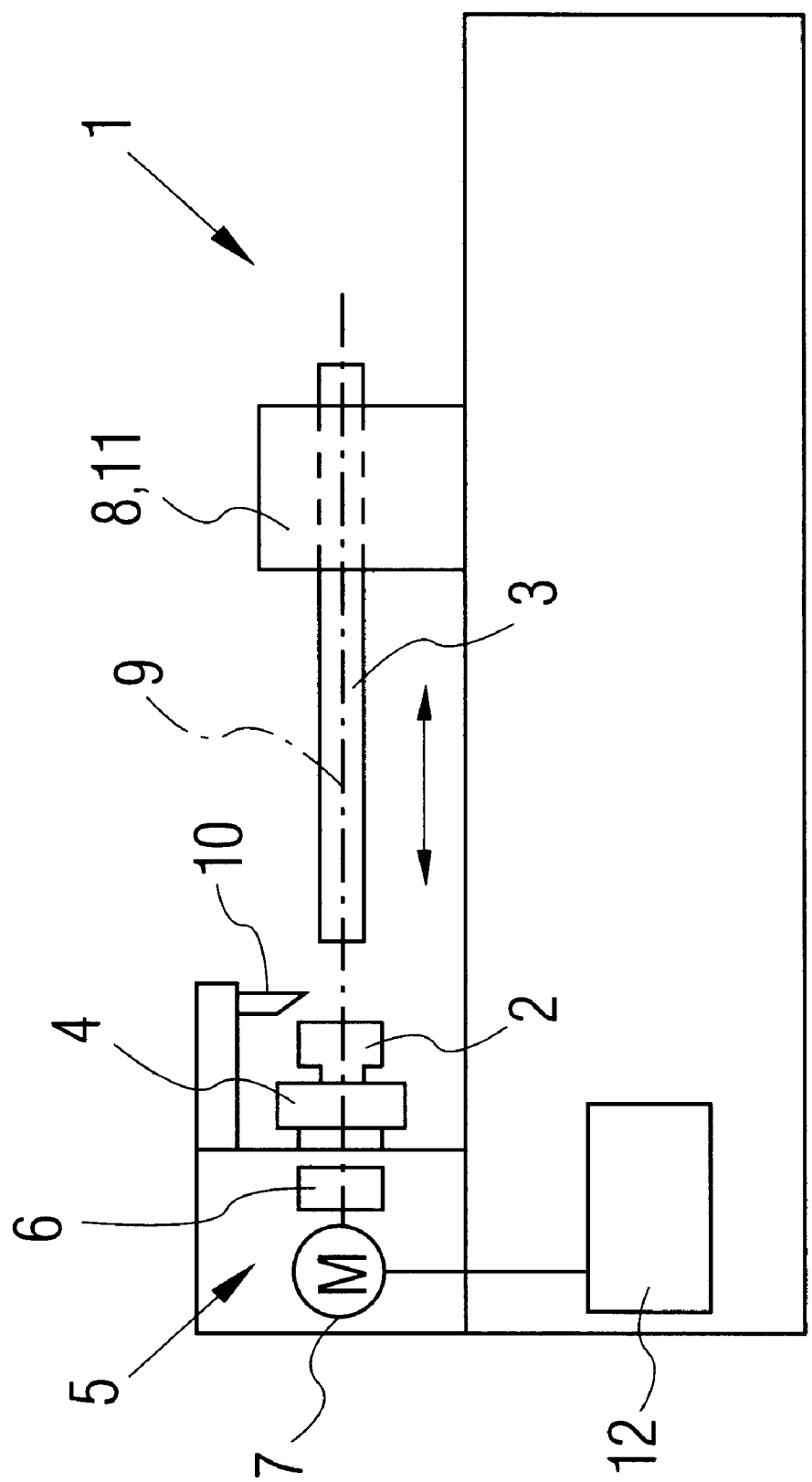
FIG. 1 is a side view of a friction welding device.

Referring to the drawings, FIG. 1 shows a friction welding device 1 for connecting two workpieces 2, 3 by friction welding. This is a single-head machine, in which one of the workpieces 2 is clamped in a clamping device 4 designed as a lathe chuck, and the other workpiece 3 is clamped in an axially displaceable clamping device 8. The clamping device 8 is also the upsetting device 11, with which the upsetting stroke or the end stroke for the axial connection of the two workpieces 2, 3 is performed.

In a variant of the exemplary embodiment shown, it is also possible to use a double-head machine, which is equipped with two lathe chucks. Other machine variants are possible as well.

The two workpieces 2, 3 are preferably designed as cylindrical tubes or have tubular sections at the weld. They have an external diameter/wall thickness dimension ratio of at least 10:1 and preferably 20:1 or greater. The preferred field of use is shafts or axles in the manufacture of vehicles. Any other fields of use are possible as well.

The two workpieces 2, 3 differ significantly in terms of their material properties, especially their hardness and/or melting point. The workpiece with the greater hardness or melting point is preferably clamped in the clamping device 4 that is connected to the rotating drive 5. The connection of a joint head 2 made of steel to a cardan shaft 3, which consists of an aluminum alloy, is performed in the embodiment shown. In the case of workpieces 2, 3 consisting of the same basic material, e.g., alloys and especially light metal alloys with different hardnesses, the hard or higher-melting material 2 is likewise clamped on the rotating drive side.

The rotating drive 5 comprises, in the known manner, a motor 7 and a transmission 6, which are connected to the lathe chuck 4. The rotating drive 5 is actuated via a machine control 12, which is preferably computerized and freely programmable.

The friction welding device 1 additionally has a device 10 for leveling the friction surface of the harder or higher-melting workpiece 2 in the area of the rotating clamping device 4. In the exemplary embodiment shown, it is a tool that can be fed, with which the friction surface can be faced and aligned at right angles to the axis of rotation 9 of the friction welding device 1. The leveling of the friction surface before the friction welding process in the clamped position of the workpiece 2 has a favorable effect on the quality and the reproducibility of the result of the friction welding.

The friction welding process will be explained in greater detail below on the basis of the flow chart in FIG. 2.

The two workpieces 2, 3 are axially distanced from one another before the friction welding process. The rotating drive 5 is started and it is revved up in idle, and the two workpieces 2, 3 are at the same time being moved closer to one another by the upsetting device 11 and the feed device, respectively, in quick motion along the axis of rotation 9.

It proved to be favorable for the friction welding process to use a lower idle speed than usual. It is about 300 rpm in the preferred exemplary embodiment of an aluminum/steel connection. Practical experience shows that it may be varied from 50 to 500 rpm, and it may also be outside this range, depending on the material pair in question.

Figure 2:
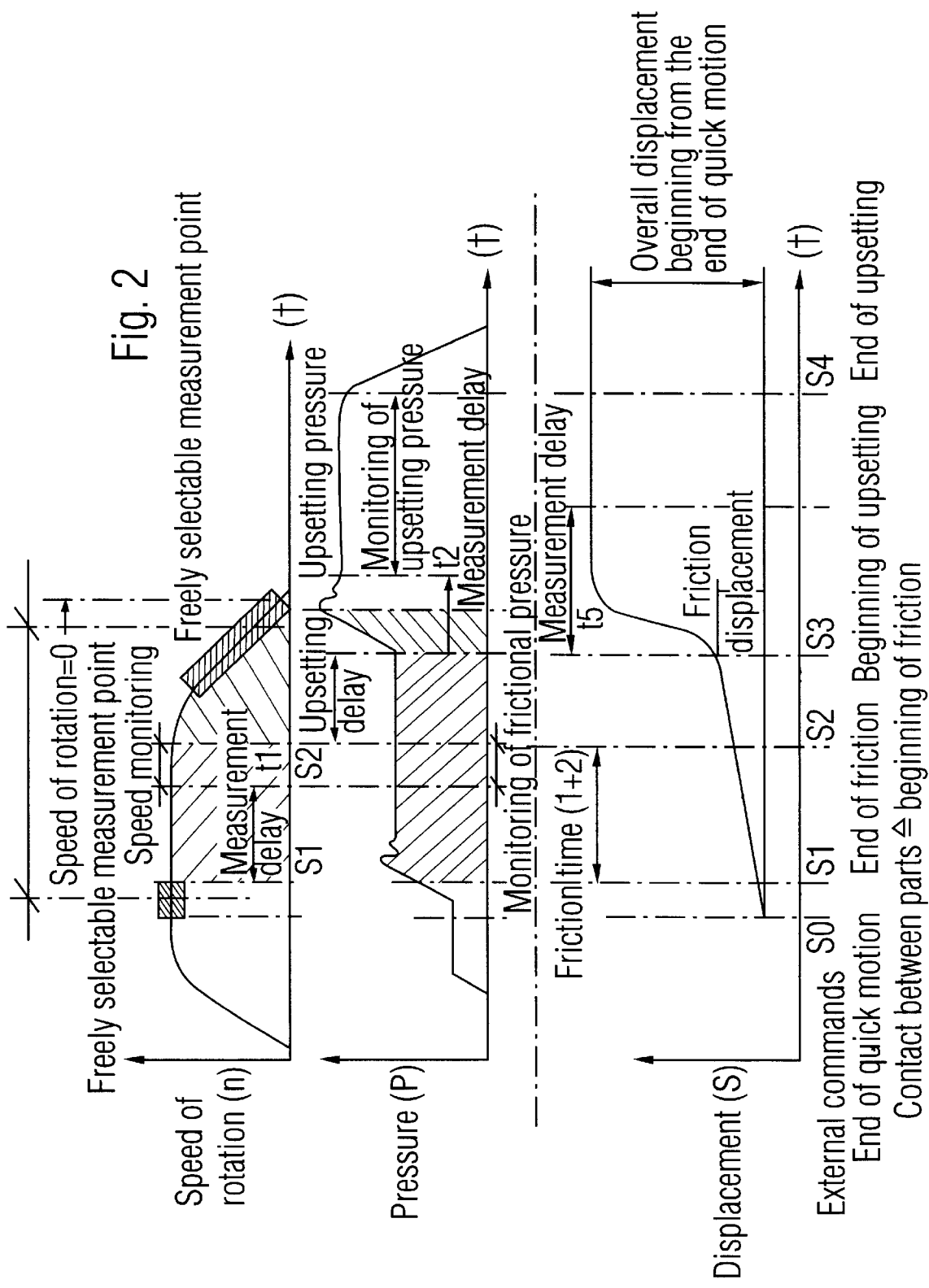
FIG. 2 is the flow chart of a friction welding process with the changes in speed of rotation, pressure and displacement as a function of the time.

As is shown in FIG. 2 in the lower diagram showing the displacement as a function of time, the rapid motion is switched off shortly before the workpieces come into contact with one another, and the two workpieces 2, 3 are moved toward each other at creep rate. As soon as the workpieces 2, 3 touch each other, they are rotated at their faces in frictional contact and with an essentially constant contact pressure relative to one another.

The angle of rotation of the relative rotation during the friction process is limited. It is measured from the beginning of friction until the rotary movement stops friction process. The beginning of friction is the point in time at which a measurable and significant deformation of the workpiece and the associated shortening of the workpiece begin. The beginning of the friction may follow the first contact between the two workpieces 2, 3 preferably with a slight delay. The delay may be due to measurement technical reasons, on the one hand, and, on the other hand, it may be determined by the rate of feed and/or a possible, so-called prior initial friction time.

The friction time is the time from the beginning of friction to the switching off of the rotating drive 5. The workpiece 2 continues to rotate after the switching off due to the inertia of masses in the drive train under the decelerating action of the frictional forces until the rotation comes to a standstill. The angle of rotation is preferably between 290° and 430° in the exemplary embodiment shown. Usable results are also obtained for an angle of rotation range of ca. 180° to 720°. According to prior experience, the angle of rotation should not be greater than 1,080°.

The angle of rotation is set and controlled in the embodiment shown via the to friction time only. The inertias of masses in the drive train are adapted for this correspondingly to ensure a rapid deceleration after the drive has been switched off. It is recommended, in particular, to reduce the moving masses and to select a suitable ratio of the transmission 6. This is also in agreement the desired low idle speed of about 300 rpm.

The angle of rotation is measured, which is done, e.g., accurately and directly via an angle measurement by means of shaft encoders or directly and approximately via a continuous speed measurement and recalculation. For measurement technical reasons, the speed measurement starts shortly after the beginning of friction and ends shortly before the rotation comes to a complete stop. The diagram in FIG. 2 illustrates the range of measurement. As a result, the measured or calculated angle of rotation may be slightly smaller than the actual angle of rotation.

In the simplest case, the friction time necessary for the desired angle of rotation or angle of rotation range can be determined empirically from tests. The friction time is set at the machine control 12. A practical value for the friction time is about 100 msec at a speed of about 300 rpm and an angle of rotation of about 360°, the phase of deceleration after switching off being likewise about 100 msec.

As is illustrated by the diagram in the middle of FIG. 2 with the indication of the pressure over time, the upsetting stroke takes place with an adjustable upset delay after the end of the friction time and the switching off of the rotary drive 5. The upsetting stroke may begin during the phase of deceleration and still before the relative movement between the workpieces 2, 3 comes to a standstill. The shortening of the workpiece occurring simultaneously during the friction process and the subsequent upsetting can be read in the lower diagram.

Various measuring devices not shown are arranged in the friction welding device 1. For example, the first contact of the workpieces 2, 3 and/or the beginning of friction can be detected and measured via the force or pressure occurring in the upsetting device 11. Other suitable measurement methods and corresponding devices may also be used as an alternative. For example, the beginning of the friction can also be determined via the feed displacement. The tolerances of the workpieces 2, 3 and of the clamping are very small in the case of friction welding, which is used mainly for series production, so that the feed displacement represents a significant variable with a sufficient accuracy.

Furthermore, suitable shaft encoders or other measuring instruments for the measurement of the amount of rotation and/or angle of rotation are present at the rotating drive 5. The angle of rotation is thus measured or calculated and monitored in the machine control 12 from the beginning of the friction to the cessation of rotation. In addition, the speed of rotation can thus also be monitored, which is preferably performed cyclically and in real time during the friction time until shortly before the cessation of rotation.

Furthermore, there are suitable measuring devices for measuring the displacement of the workpiece and the shortening of the workpiece. Like the other measuring devices mentioned above, these are also connected to the machine control 12.

The different measuring devices may be used not only to monitor the friction welding process and its parameters, but also to control and regulate the friction welding process. It is thus possible, e.g., to use a braking means, preferably an electric motor brake, which actively brakes and possibly stops the rotating drive 5 as a function of the measured angle of rotation, if it is desirable that the angle of rotation be maintained more accurately. This braking device may be arranged on the side of the rotating drive 5 and act on same directly. As an alternative, an increased braking action may also be achieved via a stronger frictional force and the upsetting device 11.

While specific embodiments of the invention have been shown and described in detail to illustrate the application of the principles of the invention, it will be understood that the invention may be embodied otherwise without departing from such principles.

We claim:

1. A process for friction welding two metallic workpieces having different material properties, the process comprising the steps of:

rotating the metallic workpieces relative to each other;

moving the workpieces into friction contact with each other to cause friction welding of the metallic workpieces to each other;

limiting an angle of relative rotation between the metallic workpieces to less than 1,080 degrees during said frictional contact.

2. A process in accordance with claim 1, wherein:
   the workpieces have one of different hardnesses and melting points.

3. A process in accordance with claim 1, wherein:
   the workpieces are rotated in frictional contact in relation to one another, stopped and upset.

4. A process in accordance with claim 1, wherein:
   said angle of rotation of is approximately 180° to 720°.

5. A process in accordance with claim 1, wherein:
   said angle of rotation of is approximately 290° to 430°.

6. A process in accordance with claim 1, wherein:
   the workpieces are metal;
   said angle of rotation is measured directly or indirectly.

7. A process in accordance with claim 1, wherein:
   a rotary drive rotates one of the workpieces;
   said angle of rotation is controlled via a friction time and a switching off of said rotary drive;
   relative rotation of the workpieces stops within said 1,080° of relative rotation during said friction contact;
   upsetting of the workpieces occurs after said relative rotation stops.

8. A process in accordance with claim 7, wherein:
   said friction time is adapted to inertias of masses of said rotary drive and of said one workpiece, said friction time is also adapted to frictional forces occurring during said frictional contact.

9. A process in accordance with claim 1, wherein:
   said relative rotating is at a speed of approximately 50 to 500 rpm.

10. A process in accordance with claim 1, wherein:
    said relative rotating is at a speed of approximately 300 rpm.

11. A process in accordance with claim 1, wherein:
    a more resistant of the workpieces is rotated, and a less resistant of the workpieces is held stationary.

12. A process in accordance with claim 1, wherein:
    a rotary drive rotates one of the workpieces in a clamped position during said moving;
    a friction welding surface of said one workpiece is faced at right angles to an axis of rotation of said rotated workpiece while said rotary drive rotates said one workpiece in said clamped position before said friction welding.

13. A process in accordance with claim 1, wherein:
    a feeding means is provided for said moving;
    a beginning of said frictional contact of the workpieces is determined by measuring a pressure of said feed means.

14. A device for friction welding of workpieces having different properties, the device comprising:
    rotating means for rotating one of the workpieces with respect to another of the workpieces;
    feeding means for feeding the workpieces into friction contact with each other under a feed pressure to cause friction welding of the workpieces to each other;
    control means for detecting a beginning of said frictional contact and for setting a friction time of the workpieces being in said frictional contact, said control means controlling said rotating means and said feeding means to limit an angle of rotation between the workpieces to less than 1,080 degrees during said frictional contact.

15. A device in accordance with claim 14, wherein:
    the workpieces have one of different hardnesses and melting points.

16. A device in accordance with claim 14, wherein:
    the workpieces are metal;
    said control means adjusts said friction time to a short value to limit said angle of rotation.

17. A device in accordance with claim 14, wherein:
    said control means limits said angle of rotation to approximately 180° to 720°.

18. A device in accordance with claim 14, wherein:
    said control means limits said angle of rotation to approximately 290° to 430.

19. A device in accordance with claim 14, wherein:
    said control means includes means for determining one of an angle of rotation and a speed of rotation of one of the workpieces, said control means stops relative rotation between the workpieces within said 1,800 degrees during said frictional contact, said control means upsets the workpieces after stopping said relative rotation.

20. A device in accordance with claim 14, wherein:
    said control means causes said rotating means to rotate at a speed of approximately 50 to 500 rpm.

21. A device in accordance with claim 14, wherein:
    said control means causes said rotating means to rotate at a speed of approximately 300 rpm.

22. A device in accordance with claim 14, further comprising:
    leveling means for facing one of the workpieces during rotating of said one workpiece.

23. A process for friction welding of two metallic workpieces having different material properties the process comprising the steps of:
    rotating the metallic workpieces relative to each other;
    moving the metallic workpieces into friction contact with each other to cause friction welding of the metallic workpieces within 1,080 degrees of relative rotation during said frictional contact.

24. The process in accordance with claim 23, wherein:
    relative rotation of the workpieces stops within said 1,080 degrees of relative rotation during said friction contact;

upsetting of the workpieces occurs after said relative rotation stops;

the workpieces are formed of metal.

* * * * *